United States Patent
Patil

(10) Patent No.: US 9,749,401 B2
(45) Date of Patent: Aug. 29, 2017

(54) INTELLIGENT LOAD BALANCER SELECTION IN A MULTI-LOAD BALANCER ENVIRONMENT

(71) Applicant: Brocade Communications Systems, Inc., San Jose, CA (US)

(72) Inventor: Dhanashri Patil, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 238 days.

(21) Appl. No.: 14/848,035

(22) Filed: Sep. 8, 2015

(65) Prior Publication Data

US 2017/0013049 A1 Jan. 12, 2017

Related U.S. Application Data

(60) Provisional application No. 62/191,073, filed on Jul. 10, 2015.

(51) Int. Cl.
*G06F 15/173* (2006.01)
*H04L 29/08* (2006.01)
(Continued)

(52) U.S. Cl.
CPC .......... *H04L 67/1002* (2013.01); *G06F 9/455* (2013.01); *G06F 9/5083* (2013.01)

(58) Field of Classification Search
USPC ....... 709/203, 206, 217, 219, 223, 224, 226, 709/228, 232, 238; 713/150; 715/733
See application file for complete search history.

(56) References Cited

U.S. PATENT DOCUMENTS 5,774,660 A * 6/1998 Brendel ............... H04L 29/06 709/203
7,103,647 B2 * 9/2006 Aziz .................... H04L 29/06 709/220

(Continued)

FOREIGN PATENT DOCUMENTS

CN 103782552 A 5/2014
WO 2014139564 A1 9/2014
(Continued)

OTHER PUBLICATIONS

PCT Patent Application No. PCT/US16/19510 filed on Feb. 25, 2016 by Eswara Chinthalapati et al.
(Continued)

*Primary Examiner* — Quang N Nguyen
(74) *Attorney, Agent, or Firm* — Fountainhead Law Group P.C.

(57) ABSTRACT

Techniques for performing intelligent load balancer selection in a multi-load balancer environment are provided. In one embodiment, a computer system can generate a user interface for deploying a virtual IP address (VIP) on a load balancer in a network environment, where the network environment includes a plurality of load balancers, and where the user interface presents a plurality of criteria for selecting one of the plurality of load balancers. The computer system can further receive, from a user, a selection of one or more of the plurality of criteria, and can collect, from each load balancer in the plurality of load balancers, statistics that are relevant to the one or more criteria. The computer system can then select a load balancer from among the plurality of load balancers based on the one or more criteria and the collected statistics.

17 Claims, 4 Drawing Sheets

(51) Int. Cl.
　　　*G06F 9/455*　　　(2006.01)
　　　*G06F 9/50*　　　(2006.01)

(56) References Cited

U.S. PATENT DOCUMENTS

| | | | |
|---|---|---|---|
| 7,292,535 | B2 | 11/2007 | Folkes et al. |
| 7,373,500 | B2* | 5/2008 | Ramelson ............ H04L 63/0428 713/150 |
| 7,519,056 | B2 | 4/2009 | Ishwar et al. |
| 8,046,694 | B1* | 10/2011 | Lappas .................. G06Q 10/06 715/733 |
| 8,559,314 | B2 | 10/2013 | Yedavalli et al. |
| 8,593,958 | B2 | 11/2013 | Zhang |
| 8,644,149 | B2 | 2/2014 | Yedavalli |
| 8,787,154 | B1 | 7/2014 | Medved et al. |
| 8,830,820 | B2 | 9/2014 | Mandal et al. |
| 8,937,961 | B1 | 1/2015 | Vairavakkalai |
| 8,949,410 | B2* | 2/2015 | Patel ................... H04L 67/1031 709/224 |
| 8,995,272 | B2 | 3/2015 | Agarwal et al. |
| 9,038,151 | B1 | 5/2015 | Chua et al. |
| 9,124,506 | B2 | 9/2015 | Jogalekar et al. |
| 9,143,558 | B2* | 9/2015 | Blander ............... H04L 67/1029 |
| 9,154,381 | B2* | 10/2015 | Dutta ...................... H04L 43/10 |
| 9,191,139 | B1 | 11/2015 | Venkata et al. |
| 9,444,842 | B2 | 9/2016 | Porras et al. |
| 9,450,817 | B1 | 9/2016 | Bahadur et al. |
| 9,450,823 | B2 | 9/2016 | Arora et al. |
| 9,467,536 | B1 | 10/2016 | Kanekar et al. |
| 9,705,783 | B2 | 7/2017 | Jogalekar et al. |
| 2003/0218982 | A1 | 11/2003 | Folkes et al. |
| 2007/0011685 | A1 | 1/2007 | Yim et al. |
| 2007/0153683 | A1 | 7/2007 | McAlpine |
| 2011/0145390 | A1 | 6/2011 | Kakadia et al. |
| 2012/0131222 | A1 | 5/2012 | Curtis et al. |
| 2013/0010600 | A1 | 1/2013 | Jocha et al. |
| 2013/0064079 | A1 | 3/2013 | Zhang |
| 2013/0094350 | A1 | 4/2013 | Mandal et al. |
| 2013/0124707 | A1 | 5/2013 | Ananthapadmanabha et al. |
| 2013/0311675 | A1 | 11/2013 | Kancherla |
| 2013/0318243 | A1 | 11/2013 | Chinthalapati et al. |
| 2014/0075519 | A1 | 3/2014 | Porras et al. |
| 2014/0149542 | A1 | 5/2014 | Luo et al. |
| 2014/0173018 | A1 | 6/2014 | Westphal et al. |
| 2014/0280817 | A1 | 9/2014 | Uppalapati et al. |
| 2014/0280893 | A1 | 9/2014 | Pfeifer et al. |
| 2015/0043382 | A1 | 2/2015 | Arora et al. |
| 2015/0071108 | A1 | 3/2015 | Lumezanu et al. |
| 2015/0103642 | A1 | 4/2015 | Stuart |
| 2015/0195162 | A1 | 7/2015 | Gandham et al. |
| 2015/0215156 | A1 | 7/2015 | Yoon |
| 2015/0256397 | A1 | 9/2015 | Agarwal |
| 2015/0304158 | A1 | 10/2015 | Dharmadhikari et al. |
| 2015/0319190 | A1 | 11/2015 | Kruglick |
| 2015/0334002 | A1 | 11/2015 | Jogalekar et al. |
| 2015/0350077 | A1 | 12/2015 | Durrani et al. |
| 2015/0358338 | A1 | 12/2015 | Zeitlin et al. |
| 2016/0043941 | A1 | 2/2016 | D'Heureuse et al. |
| 2016/0156550 | A1 | 6/2016 | Song |
| 2016/0182336 | A1 | 6/2016 | Doctor et al. |
| 2016/0205071 | A1 | 7/2016 | Cooper et al. |
| 2016/0226701 | A1 | 8/2016 | Luo et al. |
| 2016/0226742 | A1 | 8/2016 | Apathotharanan et al. |
| 2016/0285729 | A1 | 9/2016 | Chinthalapati et al. |
| 2016/0285750 | A1 | 9/2016 | Saquib et al. |
| 2016/0294731 | A1 | 10/2016 | McDaniel et al. |
| 2016/0344621 | A1 | 11/2016 | Roeland et al. |
| 2017/0041209 | A1 | 2/2017 | Joshi et al. |
| 2017/0048312 | A1 | 2/2017 | Moyer |
| 2017/0104622 | A1 | 4/2017 | Sawal et al. |

FOREIGN PATENT DOCUMENTS

| | | |
|---|---|---|
| WO | 2015032027 A1 | 3/2015 |
| WO | 2016153713 A1 | 9/2016 |

OTHER PUBLICATIONS

International Search Report & Written Opinion for PCT Application PCT/US16/19510 dated May 25, 2016, 13 pages.
OpenFlow Switch Specification, Version 1.5.0, Open Networking Foundation, Dec. 19, 2014, 277 pages.
Akyildiz et al.: "A roadmap for traffic engineering in SDN-Openflow networks", Computer Networks, vol. 71, Jun. 19, 2014, 30 pages.
NonFinal Office Action dated Nov. 18, 2016; U.S. Appl. No. 14/805,901; (9 pgs.).
Soeurt et al, Shortest path forwarding using OpenFlow, University of Amsterdam, 58 pages, Feb. 2012.
Egilmez et al., OpenQoS: An OpenFlow Controller Design for Multimedia Delivery With End-to-End Quality of Service Over Software-Defined Networks, IEEE, 8 pages, 2012.
Extended EP Search Report for EP Appln. No. 16001306.6 dated Dec. 6, 2016, 10 pages.
NonFinal Office Action dated Mar. 24, 2017; U.S. Appl. No. 14/721,978; (31 pgs.).
Zartash Afzal Uzmi, Markus Nebel, Ahsan Tariq, Sana Jawad, Ruichuan Chen, Aman Shaikh, Jia Wang, and Paul Francis, "SMALTA: Practical and Near-Optimal FIB Aggregation," Pulished in: Proceedings of the Seventh Conference on emerging Networking Experiments and Technologies. Tokyo, Japan, Dec. 6-9, 2011. Article No. 29, 12 pages.
Christian E. Rothenberg, Marcelo R. Nascimento, Marcos R. Salvador, Carlos N.A. Correa, Sidney c. de Lucena, and Robert Raszuk, "Revising Routing Control Platforms with the Eyes and Muscles of Software-Defined Networking." HotSDN'12, Aug. 13, 2012, Helsinki, Finland. pp. 13-28.
Marcelo Ribeiro Nascimento, Christian Esteve Rothenberg, Marcos Rogerio Salvador and Mauricio Ferreira Magalhaesy, "QuagFlow: Partnering Quagga with OpenFlow", SIGCOMM'10, Aug. 30-Sep. 3, 2010, New Delhi, India, 2 pages.
Paul Zimmerman, "OpenDaylight Controller: Binding-Independent Components", Mar. 23, 2013, 16 printed pages. Available online: https://wiki.opendaylight.org/index.php?title=OpenDaylight_Controller:Binding-Independent_Components&oldid=331.
Paul Zimmerman, "OpenDaylight Controller: Binding Aware Components", Mar. 23, 2013, 10 printed pages. Available online: https://wiki.opendaylight.org/index.php?title=OpenDaylight_Controller:Binding_Aware_Components&oldid=339.
Ivan Pepelnjak, "Hybrid OpenFlow, the Brocade Way", Jun. 19, 2012, 3 printed pages. Available online: http://web.archive.org/web/20130514054903/http://blog.ioshints.info/2012/06/hybrid-openflow-brocade-way.html.
Notice of Allowance dated Mar. 29, 2017; U.S. Appl. No. 14/805,901; (16 pgs.).
Adrichem et al.: "Fast Recovery in Software-Defined Networks", EWSDN, 2014, 6 pages.
Kempf et al.: "Scalable Fault Management for OpenFlow", ICC, IEEE 2012, 5 pages.
Tilmans: "Robust fault-recovery in Software-Defined Networks", Ecole Polytechnique de Louvain, Masters Thesis, 2013-2014, 104 pages.
U.S. Appl. No. 61/832,655, filed Jun. 7, 2013 by Jogalekar et al.
U.S. Appl. No. 62/089,028, filed Dec. 8, 2014 by Durrani et al.
U.S. Appl. No. 62/005,177, filed May 30, 2014 by Durrani et al.
U.S. Appl. No. 62/141,672, filed Apr. 1, 2015 by Sreenivasa et al.
U.S. Appl. No. 62/191,073, filed Jul. 10, 2015 by Patil.
U.S. Appl. No. 62/204,388, filed Aug. 12, 2015 by Moyer.
U.S. Appl. No. 62/247,904, filed Oct. 29, 2015 by Moyer et al.
U.S. Appl. No. 62/136,922, filed Mar. 23, 2015 by Saquib et al.
U.S. Appl. No. 14/805,901, filed Jul. 22, 2015 by Jogalekar et al.
U.S. Appl. No. 14/721,978, filed May 26, 2015 by Durrani et al.
U.S. Appl. No. 14/874,055, filed Oct. 2, 2015 by McDaniel et al.
U.S. Appl. No. 14/918,441, filed Oct. 20, 2015 by Moyer.
U.S. Appl. No. 14/923,738, filed Oct. 27, 2015 by Saquib et al.
U.S. Appl. No. 14/923,769, filed Oct. 27, 2015 by Chinthalapati et al.
Hommes: "Fault Detection and Network Security in Software-Defined Networks with Openflow"; PhD Dissertation; PhD-FSTC-

(56) References Cited

OTHER PUBLICATIONS 2014-06; The Faculty of Sciences, Technology and Communication; Mar. 25, 2014; 130 pages.
http://www.juniper.net/documentation/en_US/junos14.2/topics/example/cos-based-forwarding-example-cos-config-guide.html; 3 pages.
http://www.cisco.com/c/en/us/td/docs/ios/12_0s/feature/guide/gscbts.html; 56 pages.
http://blog.hoff.geek.nz/tag/cos-based-forwarding/; 16 pages.
NonFinal Office Action dated Apr. 21, 2017; U.S. Appl. No. 14/923,769; (58 pgs.).
Notice of Allowance dated Apr. 27, 2017; U.S. Appl. No. 14/923,738; (40 pgs.).
NonFinal Office Action dated Jun. 5, 2017; U.S. Appl. No. 14/874,055; (45 pgs.).
Port Mirroring with Linux Bridges; Waldner; Jun. 17, 2014.

\* cited by examiner

*FIG. 3*

INTELLIGENT LOAD BALANCER SELECTION IN A MULTI-LOAD BALANCER ENVIRONMENT

CROSS-REFERENCES TO RELATED APPLICATIONS

The present application claims the benefit and priority under U.S.C. 119(e) of U.S. Provisional Application No. 62/191,073, filed Jul. 10, 2015, entitled "POLICY-BASED SMART LOAD BALANCER SELECTION IN A MULTI-LOAD BALANCER ENVIRONMENT." The entire contents of this provisional application are incorporated herein by reference for all purposes.

BACKGROUND

As known in the field of computer networking, a load balancer is a physical or virtual network device that (1) intercepts, from clients, network traffic directed to one or more services (e.g., an application, a website, etc.), and (2) distributes that traffic across a cluster of real servers configured to host the services. By intercepting and distributing network traffic in this manner, the load balancer can provide greater service reliability (by, e.g., directing traffic away from failed servers), better service performance (by, e.g., reducing the load on each real server), and greater security (by, e.g., isolating the real servers from the clients).

Generally speaking, the process of enabling load balancing for a particular service in a network environment involves configuring a virtual IP address (VIP) for the service on a load balancer of the environment. This VIP, which is associated with a physical ingress port (or group of ingress ports) of the load balancer, is presented to external clients as the endpoint address of the service. In addition, the process involves associating, on the load balancer, the VIP (and/or the service) with the IP addresses of a number of real servers in the network environment. The real servers are configured to host the service identified by the VIP. With this configuration in place, when a client attempts to access the service using the VIP, the load balancer receives the client request because the VIP points to the load balancer rather than the real servers. The load balancer then applies a load balancing algorithm (e.g., round robin, weighted round robin, etc.) to select a particular real server for handling the request from among the group of real servers associated with the service/VIP and forwards the request, using network address translation, to the selected real server.

In a network environment that comprises a single load balancer, enabling load balancing for a service is straightforward because there is no choice involved in terms of selecting which load balancer will host the service's VIP (and thus will carry out load balancing duties for the service); the service can only be configured on the environment's singular load balancer. However, in network environments that comprise a pool of multiple available load balancers such as a large-scale data center, enabling load balancing for a service involves answering a threshold question of which load balancer in the environment should be configured to handle the traffic for the service. Once a particular load balancer in a pool of available load balancers is selected, the network administrator can perform the tasks of configuring the VIP and real server IP addresses on that selected load balancer as discussed above.

In most multi-load balancer environments today, the question of load balancer selection is typically addressed manually and in an ad-hoc manner by network administrators. For example, a network administrator may select a load balancer at random, or based on the administrator's perception of what the "best" load balancer should be in view of the nature of the service. This manual, ad-hoc approach can lead to inefficient usage of load balancer resources, since the network administrator may select a load balancer that he/she thinks is appropriate, when in fact the selection of a different load balancer may result in, e.g., less resource use, better service performance, etc.

Accordingly, it would be desirable to have a more structured and automated approach for load balancer selection in a multi-load balancer environment that allows for optimized usage of load balancer resources.

SUMMARY

Techniques for performing intelligent load balancer selection in a multi-load balancer environment are provided. In one embodiment, a computer system can generate a user interface for deploying a virtual IP address (VIP) on a load balancer in a network environment, where the network environment includes a plurality of load balancers, and where the user interface presents a plurality of criteria for selecting one of the plurality of load balancers. The computer system can further receive, from a user, a selection of one or more of the plurality of criteria, and can collect, from each load balancer in the plurality of load balancers, statistics that are relevant to the one or more criteria. The computer system can then select a load balancer from among the plurality of load balancers based on the one or more criteria and the collected statistics.

The following detailed description and accompanying drawings provide a better understanding of the nature and advantages of particular embodiments.

BRIEF DESCRIPTION OF DRAWINGS

FIG. 3 depicts a user interface for enabling intelligent load balancer selection according to an embodiment.

DETAILED DESCRIPTION

Figure 1:
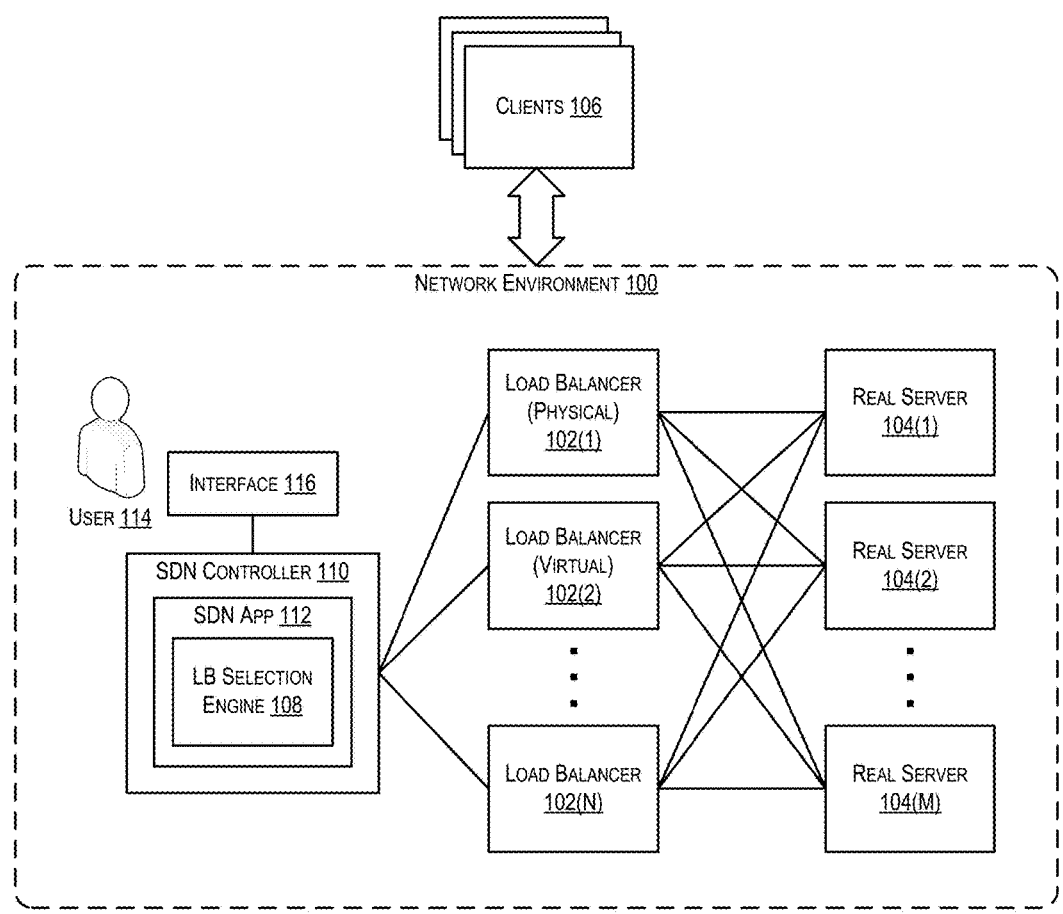
FIG. 1 depicts a multi-load balancer network environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure provides techniques for intelligently selecting a load balancer in a multi-load balancer network environment for the purpose of handling load balancing duties for a service (i.e., hosting a VIP for that service). In one set of embodiments, a computer system can generate a user interface for deploying the VIP, where the user interface includes a set of criteria that should be satisfied when selecting a load balancer in the environment that will host the VIP. This set of criteria can include, e.g., resource-based criteria (e.g., CPU usage, memory usage, etc.), load balancing performance-based criteria (e.g., total concurrent sessions, total concurrent connections, total packet throughput, minimum latency, etc.), location-based criteria (e.g., minimum geographic distance between load balancer and real servers), and/or others. In a particular embodiment, these criteria can be preconfigured by an administrator and presented in the user interface as one or more "policies."

The computer system can then receive, from a user, a selection of one or more of the criteria/policies, and can collect statistics/information from the load balancers in the environment that are relevant to the chosen criteria/policies, such as current resource usage of each load balancer (e.g., CPU usage, memory usage, etc.), current load balancing statistics of each load balancer (e.g., number of active connections/sessions, etc.), and so on.

Finally, the computer system can select a load balancer from the pool of available load balancers in a manner that most optimally satisfies the chosen criteria/policies (based on the statistics/information collected from each load balancer). For example, in a case where the user has specified a resource-based criterion of CPU usage less than 50%, the computer system can select an available load balancer whose current CPU usage is the furthest below 50%. As another example, in a case where the user has specified a load balancing performance-based criterion of 100 K concurrent connections, the computer system can select an available load balancer whose current workload allows for at least this level of performance (by, e.g., calculating max concurrent connections minus current concurrent connections). In this way, the computer system can select the most appropriate (i.e., "best") load balancer in view of the user-defined criteria/policies and the current state of the load balancers in the environment.

In certain embodiments, the pool of available load balancers can include both physical and virtual load balancers, as well as load balancers from different vendors. The computer system can communicate with each of these different load balancers using the APIs, protocols, and commands native to the load balancer.

In further embodiments, the computer system described above can be implemented using a Software Defined Networking (SDN) controller, and the processing performed by the computer system can be embodied in an SDN application running on the controller. Accordingly, these embodiments can leverage existing SDN infrastructure in the network environment to facilitate load balancer selection.

These and other features of the present disclosure are discussed in further detail in the sections that follow.

2. Network Environment

FIG. 1 depicts a network environment 100 that supports intelligent load balancer selection according to an embodiment. As shown, network environment 100 includes a number of load balancers 102(1)-(N) that are communicatively coupled with a number of real servers 104(1)-(M). Further, network environment 100 is communicatively coupled with a number of clients 106. Load balancers 102 are operable to perform load balancing with respect to one or more services that are consumed by clients 106 and hosted on real servers 104. For example, load balancer 102(1) may be configured with a VIP for a particular service S1 hosted on real servers 104(1) and 104(2). In this scenario, load balancer 102(1) can receive, from clients 106, network traffic for S1 that is directed to the VIP and can distribute the traffic between real servers 104(1) and 104(2) according to a configured load balancing algorithm.

In the embodiment of FIG. 1, load balancers 102 comprise both virtual and physical load balancers. For instance, load balancer 102(1) is a physical (e.g., hardware-based) load balancing device (e.g., an application delivery switch), while load balancer 102(2) is a virtual (e.g., software-based) load balancer. In addition, load balancers 102 may be sourced from different vendors, and thus may require different communication protocols for interacting with and managing each load balancer.

As noted in the Background section, one challenge with enabling load balancing for services in a multi-load balancer network environment such as FIG. 1 is that a user must make a threshold decision of which load balancer will be used for a particular service. Once a load balancer has been selected, the user can take the appropriate steps of configuring the VIP and real server IP addresses for the service on that load balancer. In the past, this selection process has generally been performed manually and in an ad-hoc manner. However, such manual selection often results in sub-optimal usage of load balancer resources.

To address the foregoing and other similar issues, network environment 100 includes a novel load balancer (LB) selection engine 108 running on a computer system 110 within network environment 100. In this particular embodiment, computer system 110 is an SDN controller and LB selection engine is implemented within an SDN application 112 executing on SDN controller 110. With this SDN-based approach, application 112 can seamlessly fit in as another network service within the SDN infrastructure of environment 100, and data from engine 108/application 112 can be easily consumed/leveraged by other SDN applications running on SDN controller 110 as they will typically make use of similar data formats and a shared data store. In alternative embodiments, LB selection engine 108 can be implemented in a non-SDN context.

As described further detail below, at a time a user (e.g., user 114) wishes to enable load balancing with respect to a new or existing service within environment 100, LB selection engine 108 can receive, from user 114 via a user interface 116, one or more criteria (e.g., preconfigured policies) for selecting a load balancer that will host the VIP for the service. LB selection engine 108 can then communicate with load balancers 102 to collect statistics/information that are relevant to the chosen criteria. Finally, LB selection engine 108 can select, from among load balancers 102(1)-(N), the "best" load balancer for hosting the VIP in view of the user-chosen criteria and the collected statistics/information. Since this selection process is performed in an automated manner (i.e., without manual intervention or input from a user/administrator, other than the criteria/policies chosen via user interface 116), LB selection engine 108 can take the guesswork out of selecting an appropriate load balancer. Further since this selection process can take into account the actual operating statistics of the pool of available load balancers (to the extent that those statistics are relevant to the chosen criteria/policies), LB selection engine 108 can ensure that the load balancing resources of network environment 100 are optimally used.

It should be appreciated that FIG. 1 is illustrative and not intended to limit the embodiments discussed herein. For example, the entities shown in FIG. 1 may be arranged according to alternative configurations and/or may include other components or execute other functions that are not specifically described. One of ordinary skill in the art will recognize many variations, modifications, and alternatives.

3. Load Balancer Selection Workflow

Figure 2:
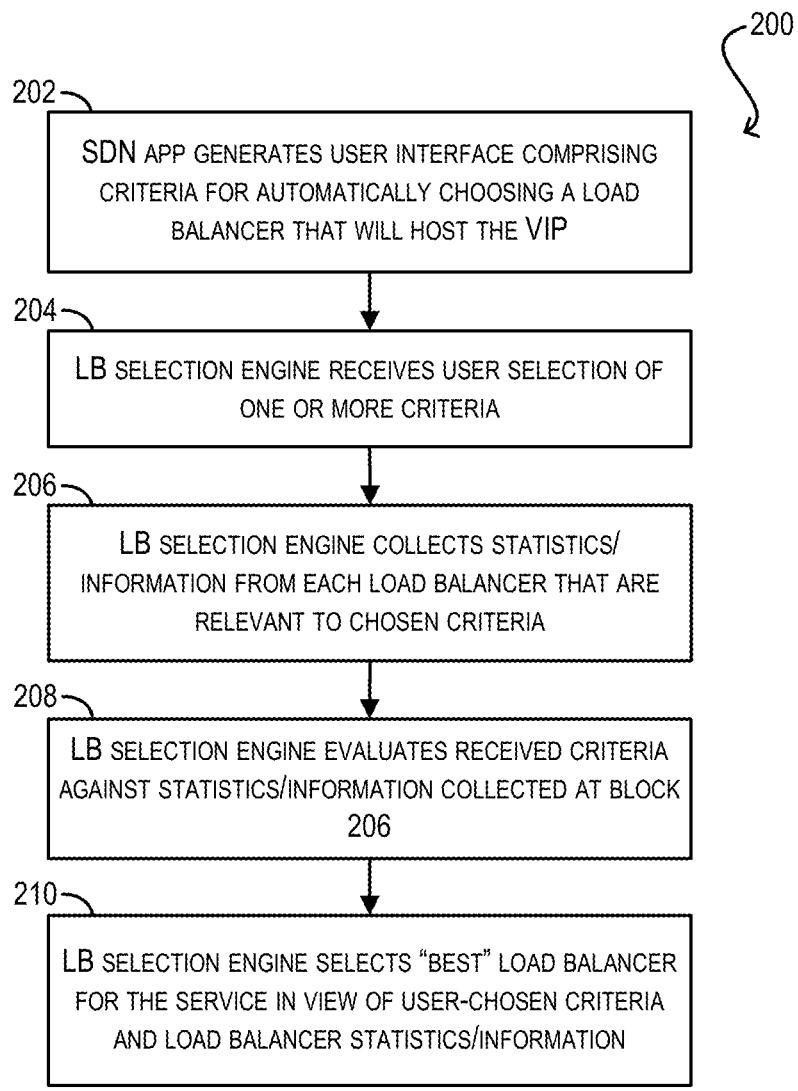
FIG. 2 depicts a workflow for performing intelligent load balancer selection within the network environment of FIG. 1 according to an embodiment.

FIG. 2 depicts a workflow 200 that can be performed by LB selection engine 108/SDN application 112 of FIG. 1 for enabling intelligent load balancer selection according to an embodiment.

Starting with block 202, at a time user 114 wishes to enable load balancing for a service hosted by one or more of real servers 104(1)-(M) in network environment 100, SDN application 112 can generate a user interface (e.g., interface 116) that enables user 114 to deploy a VIP for the service. This user interface can include, among other fields, a set of criteria to be satisfied when selecting a load balancer 102 in network environment 100 that will host the VIP. For example, in one set of embodiments, the set of criteria can include criteria that are based on system resource parameters such as CPU usage, memory usage, hardware information like temperature, fan operation/speed, disk usage (in the case of hardware load balancers), and/or parent hypervisor attributes (in the case of virtual load balancers). In other embodiments, the one or more criteria can further include criteria that are based on load balancing performance parameters, such as a total number of sessions, total number of connections, and/or total throughput. In yet other embodiments, the one or more criteria can further include criteria that are based on SDN parameters (e.g., inputs from SDN controller 110), such as flow table based inputs, traffic congestion information, etc. In yet other embodiments, the one or more criteria can also include criteria based on other types of parameters, such as geo-location (e.g., proximity of a given load balancer, in radius, to the service's real servers), bandwidth costs for the links between the load balancer and the real servers, and so on. One of ordinary skill in the art will recognize many variations for the types of criteria that may be used to select a load balancer.

Figure 3:
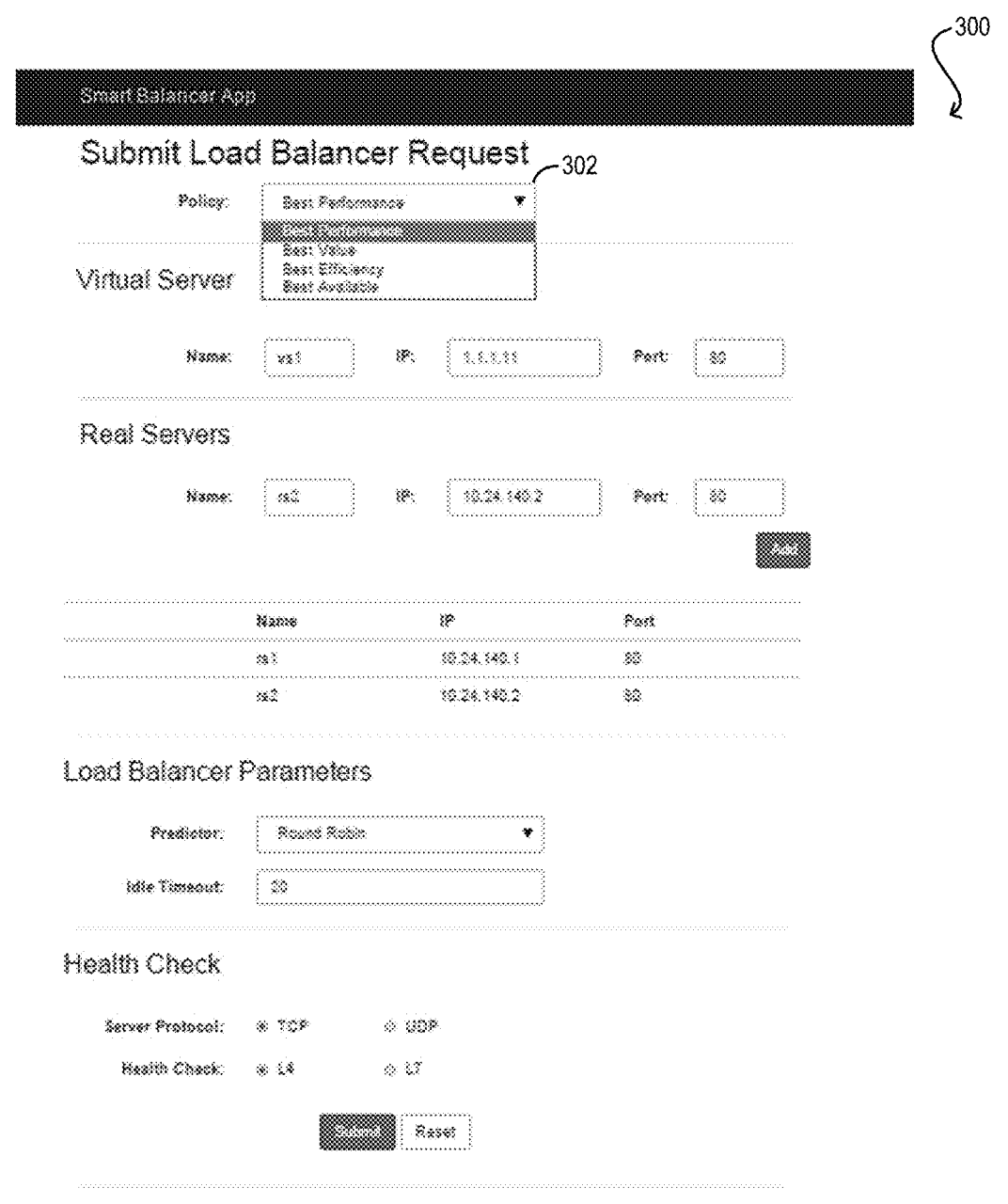

In certain embodiments, these criteria can be grouped and presented in the user interface as one or more policies. For example, FIG. 3 depicts an example user interface 300 that includes a dropdown list 302 with the load balancer selection policies "best performance, "best value," "best efficiency," or "best available." Each of the policies in dropdown list 302 can be preconfigured by an administrator to include one or more criteria that are relevant for the policy's stated purpose. In other embodiments, the criteria can be displayed in a more granular fashion, such as "closest distance," "lowest resource usage," "minimum latency," etc. In these embodiments, for some of the criteria, user 114 may be able to specify particular parameter values that qualify the criterion (e.g., support for at least X concurrent connections).

Further in some embodiments, the particular policies and/or criteria that are presented to user 114 can be configurable by a network administrator. For example, the administrator may wish to enable certain policies/criteria for certain customers based on the license they have purchased (e.g., only allow selection of the best performance policy for those customers that have purchased the highest-cost license). The configuration of which policies/criteria will be displayed to user 114 can also be based on other factors, such as the particular load balancers that are available to the user (in the case of, e.g., a multi-tenant environment).

At block 204, LB selection engine 108 can receive one or more criteria that have been chosen by user 114 from the total set of criteria presented in the user interface at block 202. Then, at block 206, LB selection engine 108 can collect statistics and/or information from each load balancer 102 (1)-(N) that are relevant to the user-chosen criteria. For instance, if user 114 has selected one or more resource-based criteria, LB selection engine 108 can collect statistics regarding the current resource usage of each load balancer (e.g., CPU usage, memory usage, etc.). Alternatively, if the user 114 has selected one or more load balancing performance-based criteria, LB selection engine 108 can collect statistics regarding the current load balancing performed by each load balancer (e.g., number of sessions, connections, etc.).

In certain embodiments, LB selection engine 108 can specifically query load balancers 102 for these statistics/ information. In other embodiments, these statistics/information can be pushed from the load balancers to engine 108. Further, in embodiments where load balancers 102 each support a different communication protocol or API, LB selection engine 108 can expose a set of interfaces that, if implemented by a load balancer vendor, can allow engine 108 to communicate with that vendor's load balancers using its native protocol/API. In alternative embodiments, LB selection engine 108 can communicate with load balancers 102 using a standardized protocol/API, such as NETCONF.

Upon collecting the statistics/information at block 206, LB selection engine 108 can evaluate the criteria against the collected statistics/information (block 208). Finally, at block 210, LB selection engine 108 can select a particular load balancer (from among load balancers 102(1)-(N)) that best meets the user-chosen criteria. For example, if user 114 has specified a performance-based criterion (such as a minimum of 100 K concurrent connections), LB selection engine 108 can select a load balancer that is best able to meet (and/or exceed) that performance level in view of its current load. As another example, if user 114 has specified a location-based criterion (such as geographic distance that is no greater than X feet or miles in radius from the real servers), LB selection engine 108 can select a load balancer that is located no further than the specified distance.

In cases where the user has specified multiple criteria and/or policies, LB engine 108 can take all of the specified criteria/policies into account, such that each criterion/policy is satisfied. If there is a tie between load balancers, LB selection engine 108 can use a round-robin approach to select one of the tied load balancers. On the other hand, if none of the load balancers satisfy the user-chosen criteria, LB selection engine 108 can use round-robin (or a different approach, such as random selection) to select a load balancer from the pool of available load balancers. In some embodiments, as part of step 206, user 114 can provide a rank value for each selected criterion/policy based on importance, thereby enabling LB selection engine 108 to give higher priority to the criteria/policies with higher rank values.

Further, in cases where network environment is a multi-tenant environment (such that only a subset of load balancers 102(1)-(N) are available to user 114), LB selection engine 108 can perform its selection processing at block 210 in a manner that only takes into account those available load balancers (and does not include load balancers used by other tenants).

It should be appreciated that workflow 200 of FIG. 2 is illustrative and various modifications are possible. For example, although workflow 200 assumes that LB engine 108 collects statistics/information from load balancers 102 (1)-9N) in network environment 100 after it has received an indication of one or more chosen criteria/policies from user 114, in certain embodiments engine 108 can perform this statistics collection on a continuous, on-going basis. In these embodiments, engine 108 can make use of historical trends or averaged statistics/data as part of its load balancer selection processing at block 210. LB selection engine 108 may also offer the user/administrator a choice of collecting statistics in an ongoing fashion or on-demand.

Further, as part of the user interface generated at block 202, SDN application 112 can include fields that allow user 114 to configure the VIP (e.g., name, IP address, port) and real servers (e.g., name, IP address, port) to be associated with that VIP, as well as other load balancing parameters (e.g., load balancing predictor algorithm, idle timeout, etc.). Examples of such fields are shown in user interface 300 of FIG. 3. In this way, SDN application 112 can provide a single, consolidated user interface that enables user 114 to both specify (1) the criteria/policies for selecting an appropriate load balancer that will host a VIP and (2) the parameters for deploying the VIP on the selected load balancer. SDN application 112 can subsequently communicate with the selected load balancer and thereby configure the load balancer to host the VIP in accordance with the specified VIP, real server, and other load balancing parameters. One of ordinary skill in the art will recognize other variations, modifications, and alternatives.

4. Computer System

Figure 4:
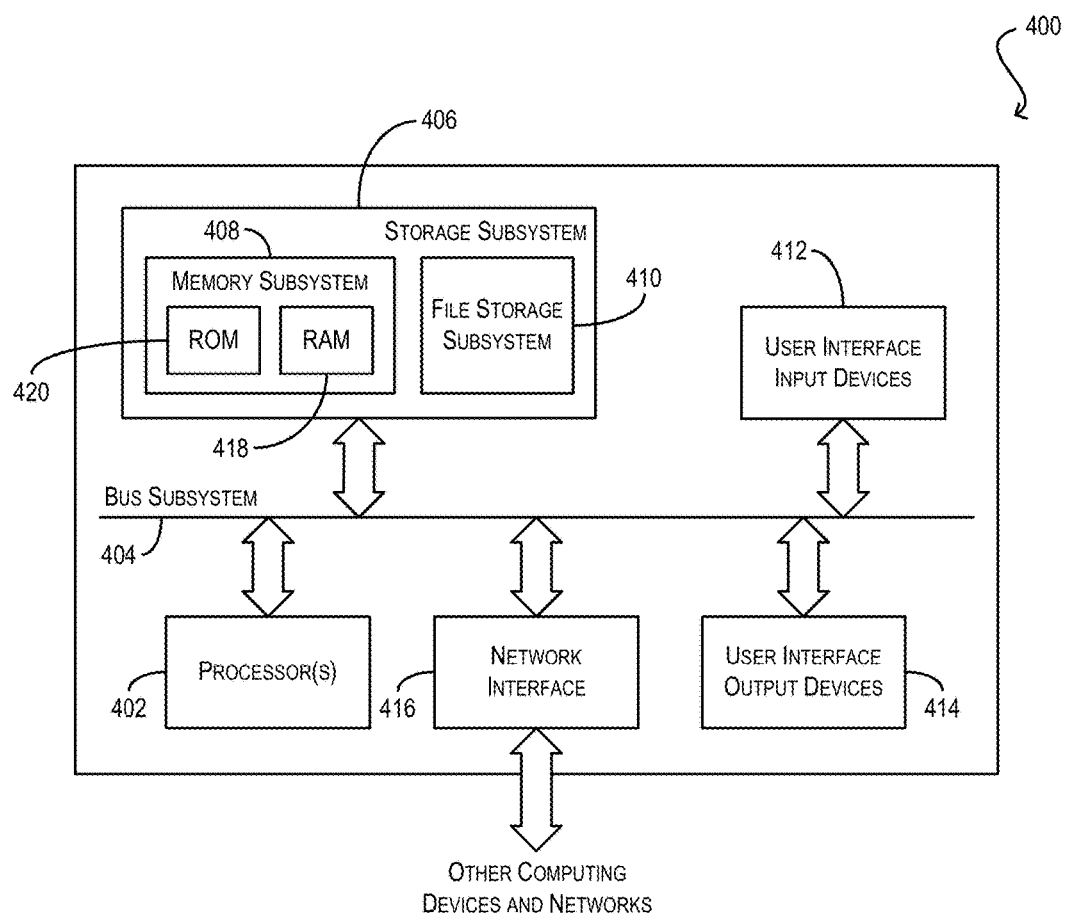
FIG. 4 depicts a computer system according to an embodiment.

FIG. 4 depicts an exemplary computer system 400 according to an embodiment. Computer system 400 can be used to implement, e.g., SDN controller 110 of FIG. 1, or any other system/device that is capable of executing LB selection engine 108. As shown in FIG. 4, computer system 400 can include one or more processors 402 that communicate with a number of peripheral devices via a bus subsystem 404. These peripheral devices can include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computer system 400 communicate with each other as intended. Although bus subsystem 404 is shown schematically as a single bus, alternative embodiments of the bus subsystem can utilize multiple busses.

Network interface subsystem 416 can serve as an interface for communicating data between computer system 400 and other computing devices or networks. Embodiments of network interface subsystem 416 can include wired (e.g., coaxial, twisted pair, or fiber optic Ethernet) and/or wireless (e.g., Wi-Fi, cellular, Bluetooth, etc.) interfaces.

User interface input devices 412 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 400.

User interface output devices 414 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 400.

Storage subsystem 406 can include a memory subsystem 408 and a file/disk storage subsystem 410. Subsystems 408 and 410 represent non-transitory computer-readable storage media that can store program code and/or data that provide the functionality of various embodiments described herein.

Memory subsystem 408 can include a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 400 is illustrative and not intended to limit embodiments of the present invention. Many other configurations having more or fewer components than computer system 400 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   generating, by a Software Defined Networking (SDN) controller, a user interface for deploying a virtual IP address (VIP) on a load balancer in a network environment, wherein the network environment includes a plurality of load balancers, and wherein the user interface includes:
      a plurality of criteria for selecting one of the plurality of load balancers;
      one or more first fields for defining the VIP; and
      one or more second fields for specifying one or more real servers that will host a service associated with the VIP;
   receiving, by the SDN controller from a user, a selection of one or more of the plurality of criteria;
   collecting, by the SDN controller from each load balancer in the plurality of load balancers, statistics that are relevant to the one or more criteria;
   selecting, by the SDN controller, a load balancer from among the plurality of load balancers based on the one or more criteria and the collected statistics; and
   communicating, by the SDN controller, with the selected load balancer in order to deploy the VIP on the selected load balancer in accordance with information entered via the one or more first fields and the one or more second fields.

2. The method of claim 1 wherein the plurality of load balancers include physical load balancers and virtual load balancers.

3. The method of claim 2 wherein the plurality of criteria include resource-based criteria, load balancing-based criteria, or location-based criteria.

4. The method of claim 3 wherein the resource-based criteria take into account CPU usage or memory usage of the plurality of load balancers.

5. The method of claim 4 wherein the resource-based criteria further take into account one or more hardware operating parameters of the physical load balancers.

6. The method of claim 5 wherein the one or more hardware operating parameters comprise fan speed, temperature, or disk usage.

7. The method of claim 4 wherein the resource-based criteria further take into account, for each virtual load balancer, one or more attributes of a parent hypervisor on which the virtual load balancer runs.

8. The method of claim 3 wherein the load balancing-based criteria take into account a number of sessions, a number of connections, or a data throughput currently being handled by the plurality of load balancers.

9. The method of claim 3 wherein the location-based criteria take into account distances between the plurality of load balancers and a plurality of real servers associated with the VIP.

10. The method of claim 1 wherein the plurality of criteria include criteria that take into account one or more inputs received from the SDN controller.

11. The method of claim 10 wherein the one or more inputs received from the SDN controller include a flow table-based input or traffic congestion information.

12. The method of claim 1 wherein the plurality of criteria include a criterion that takes into account bandwidth costs for links between the plurality of load balancers and a plurality of real servers associated with the VIP.

13. The method of claim 1 wherein the plurality of criteria are preconfigured by an administrator of the network environment.

14. The method of claim 1 wherein the selected load balancer best satisfies each of the one or more criteria.

15. The method of claim 1 wherein the plurality of load balancers include load balancers from different vendors that support different, native communication protocols, and wherein the computer system is configured to communicate with each load balancer using its native communication protocol.

16. A non-transitory computer readable storage medium having stored thereon program code executable by a computer system, the program code causing computer system to:
generate a user interface for deploying a virtual IP address (VIP) on a load balancer in a network environment, wherein the network environment includes a plurality of load balancers, and wherein the user interface presents a plurality of criteria for selecting one of the plurality of load balancers;
receive, from a user, a selection of one or more of the plurality of criteria;
collect, from each load balancer in the plurality of load balancers, statistics that are relevant to the one or more criteria;
select a load balancer from among the plurality of load balancers based on the one or more criteria and the collected statistics;
wherein the computer system is a Software Defined Networking (SDN) controller, and wherein the generating, receiving, collecting, and selecting are performed by an SDN application running on the SDN controller;
wherein the user interface includes one or more first fields for defining the VIP and one or more second fields for specifying one or more real servers that will host a service associated with the VIP; and
communicate with the selected load balancer in order to deploy the VIP on the selected load balancer in accordance with information entered via the one or more first fields and the one or more second fields.

17. A computer system comprising:
a processor; and
a non-transitory computer readable medium having stored thereon program code that, when executed by the processor, causes the processor to:
generate a user interface for deploying a virtual IP address (VIP) on a load balancer in a network environment, wherein the network environment includes a plurality of load balancers, and wherein the user interface presents a plurality of criteria for selecting one of the plurality of load balancers;
receive, from a user, a selection of one or more of the plurality of criteria;
collect, from each load balancer in the plurality of load balancers, statistics that are relevant to the one or more criteria;
select a load balancer from among the plurality of load balancers based on the one or more criteria and the collected statistics;
wherein the computer system is a Software Defined Networking (SDN) controller, and wherein the generating, receiving, collecting, and selecting are performed by an SDN application running on the SDN controller;
wherein the user interface includes one or more first fields for defining the VIP and one or more second fields for specifying one or more real servers that will host a service associated with the VIP; and
communicate with the selected load balancer in order to deploy the VIP on the selected load balancer in accordance with information entered via the one or more first fields and the one or more second fields.

* * * * *